United States Patent
Badding et al.

(10) Patent No.: US 7,781,120 B2
(45) Date of Patent: Aug. 24, 2010

(54) THERMO-MECHANICAL ROBUST SOLID OXIDE FUEL CELL DEVICE ASSEMBLY

(75) Inventors: Michael Edward Badding, Campbell, NY (US); Jacqueline Leslie Brown, Lindley, NY (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 515 days.

(21) Appl. No.: 11/804,020

(22) Filed: May 16, 2007

(65) Prior Publication Data

US 2008/0286631 A1    Nov. 20, 2008

(51) Int. Cl.
*H01M 8/02* (2006.01)
*H01M 8/24* (2006.01)
*H01M 8/12* (2006.01)

(52) U.S. Cl. .................. 429/491; 429/479; 429/463; 429/508; 429/452; 429/465; 429/507; 429/523; 29/623.1

(58) Field of Classification Search ............... 429/30, 429/32–33, 35–36, 188, 209, 231.1, 231.3; 29/623.1; H01M 8/02, 8/12, 8/24, 2/08
See application file for complete search history.

(56) References Cited

U.S. PATENT DOCUMENTS

| | | | | |
|---|---|---|---|---|
| 5,585,203 A * | 12/1996 | Chikagawa et al. | ........... | 429/35 |
| 6,475,938 B1 * | 11/2002 | Budd | ............................. | 501/5 |
| 7,416,760 B2 * | 8/2008 | Badding et al. | ............. | 427/115 |
| 7,628,951 B1 * | 12/2009 | Akash et al. | ................. | 264/603 |
| 7,687,090 B2 * | 3/2010 | Badding et al. | ............... | 426/39 |
| 2001/0044041 A1 * | 11/2001 | Badding et al. | ............... | 429/32 |
| 2003/0096147 A1 | 5/2003 | Badding et al. | ............... | 429/30 |
| 2003/0215689 A1 | 11/2003 | Keegan | ....................... | 429/35 |
| 2003/0224238 A1 | 12/2003 | Finn et al. | ...................... | 429/35 |
| 2004/0048137 A1 * | 3/2004 | Chou et al. | .................... | 429/35 |
| 2004/0175607 A1 * | 9/2004 | Itoh | ............................ | 429/35 |
| 2004/0224205 A1 * | 11/2004 | Marianowski et al. | ........ | 429/32 |
| 2005/0048357 A1 | 3/2005 | Badding et al. | ............... | 429/44 |
| 2006/0003213 A1 | 1/2006 | Ketcham et al. | .............. | 429/30 |
| 2006/0134488 A1 * | 6/2006 | Cortright et al. | .............. | 429/30 |
| 2006/0166053 A1 | 7/2006 | Badding et al. | ............... | 429/13 |
| 2006/0172875 A1 * | 8/2006 | Cortright et al. | .............. | 501/15 |

FOREIGN PATENT DOCUMENTS

| | | |
|---|---|---|
| EP | 0740358 | 10/1996 |
| EP | 0961333 | 12/1999 |
| WO | WO 2004063110 A2 * | 7/2004 |
| WO | 2006/060155 | 6/2006 |

* cited by examiner

*Primary Examiner*—Melvin C Mayes
*Assistant Examiner*—Jun Li
(74) *Attorney, Agent, or Firm*—Svetlana Z. Short

(57) ABSTRACT

A solid oxide fuel cell device assembly comprising: (i) at least one solid oxide fuel cell device including one electrolyte sheet sandwiched between at least one pair of electrodes; and (ii) a non-steel frame fixedly attached to said at least one fuel cell device without a seal located therebetween.

24 Claims, 5 Drawing Sheets

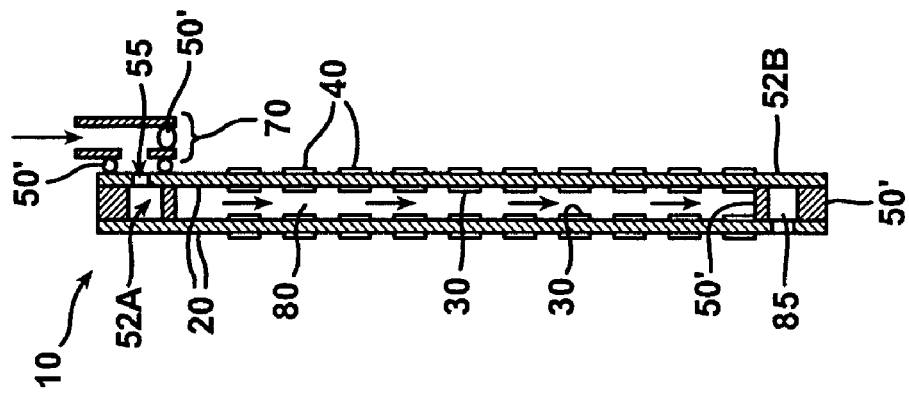
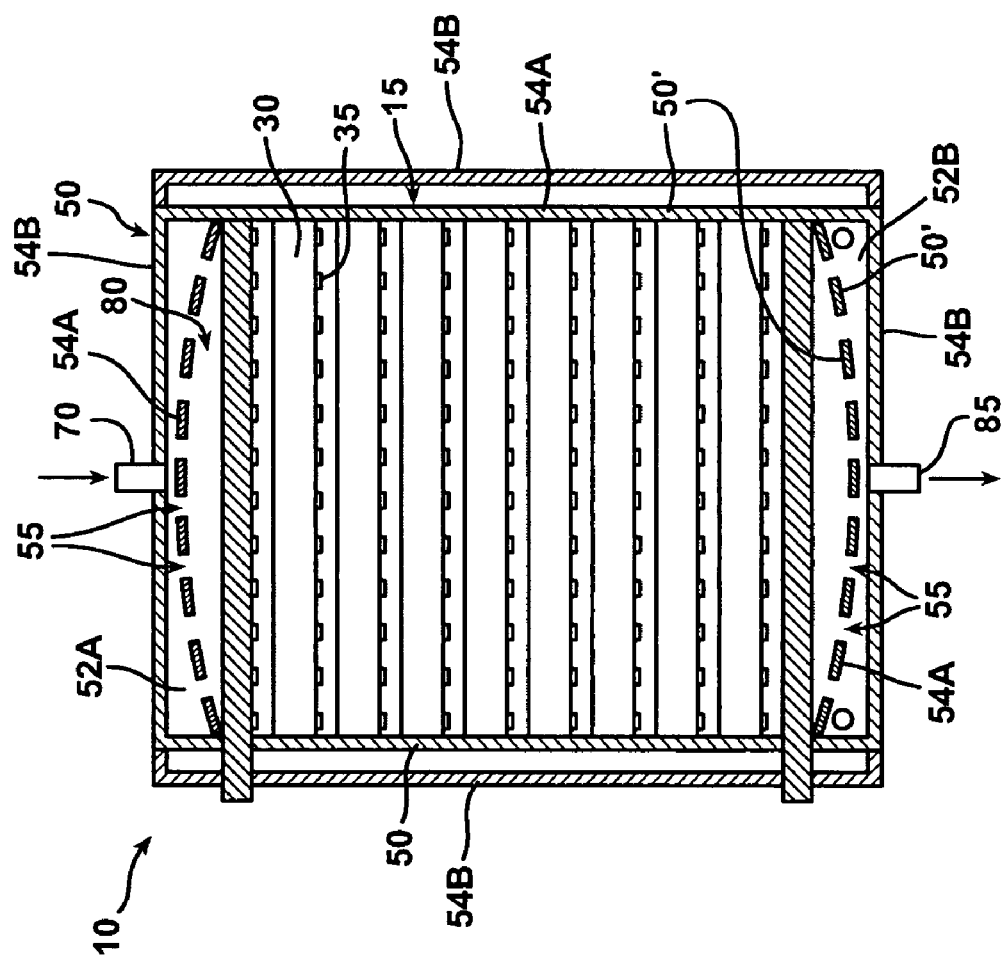

THERMO-MECHANICAL ROBUST SOLID OXIDE FUEL CELL DEVICE ASSEMBLY

BACKGROUND OF THE INVENTION

1. Field of the Invention

The present invention relates generally to fuel cell devices and more particularly to solid oxide fuel cell devices that can minimize device failure due to thermal mechanical stress.

2. Technical Background

Solid oxide fuel cells (SOFC) have been the subject of considerable research in recent years. Solid oxide fuel cells convert the chemical energy of a fuel, such as hydrogen and/or hydrocarbons, into electricity via electro-chemical oxidation of the fuel at temperatures, for example, of about 700 to about 1000° C. A typical SOFC comprises a negatively charged oxygen-ion conducting electrolyte sandwiched between a cathode layer and an anode layer. Molecular oxygen is reduced at the cathode and incorporated in the electrolyte, wherein oxygen ions are transported through the electrolyte to react with, for example, hydrogen at the anode to form water.

Some designs include electrode-electrolyte structures comprising a solid electrolyte sheet incorporating a plurality of positive and negative electrodes bonded to opposite sides of a thin flexible inorganic electrolyte sheet.

SOFC devices are typically subjected to large thermal-mechanical stresses due to the high operating temperatures and rapid temperature cycling of the device. Such stresses can result in deformation of device components and can adversely impact the operational reliability and lifetime of SOFC devices.

The electrolyte sheet of a SOFC device is typically sealed to a frame support structure in order to keep fuel and oxidant gases separate. SOFC devices endure thermal cycling and large thermal gradients, which induces thermal stresses in the electrolyte sheets. In addition, a mounted electrolyte sheet will expand at a rate that is different from the thermal expansion rate of its frame, which may cause cracking of the electrolyte sheet. In some cases, the thermal mechanical stress and resulting deformation may be concentrated at the interface between the seal and the metal frames, resulting in a failure of the seal, the electrolyte sheet, and/or the SOFC device. When a thin, flexible ceramic sheet is utilized as the electrolyte in a SOFC device, there is a higher likelihood of premature failure of the electrolyte sheet itself. Differential gas pressure and interactions between the device, the seal, and the frame due to temperature gradients and the mismatch of component properties (e.g., expansion and rigidity) may lead to increased stress at the seal and the unsupported region of the electrolyte sheet adjacent to the seal. Large electrolyte sheets are especially subject to failure caused fracturing of the electrolyte sheet due to operational or transient stresses.

U.S. Patent Publication 2006/0003213 describes the problem of stress related cracking of the SOFC device electrolyte sheet and discloses a patterned electrolyte sheet designed to compensate for environmentally induced strain and provide increased failure resistance to the device. U.S. Patent Publications 2003/0215689 and 2003/0224238 describe a metal foam seal and a high temperature felt sealing material that can be utilized to address the build up of strain at the bonding region of the electrolyte, seal, and frame. However, alternative and/or additional thermal stress minimization approaches may also serve as mitigation schemes to overcome thermal mechanical failures of fuel cell devices.

Thus, there is a need to address the thermal mechanical integrity of solid oxide fuel cell seals and electrolyte sheets, and other shortcomings associated with solid oxide fuel cells and methods for fabricating and operating solid oxide fuel cells. These needs and other needs are satisfied by the articles, devices and methods of the present invention.

SUMMARY OF THE INVENTION

According to one aspect of the present invention includes a fuel cell device assembly comprises: (i) a solid oxide fuel cell device including at least one fuel cell device including one electrolyte sheet sandwiched between at least one pair of electrodes; and (ii) a non-steel frame fixedly attached to said at least one fuel cell device without a seal located therebetween.

According to one aspect of the present invention a method for producing a fuel cell device assembly comprising the steps of: (i) producing a fuel cell device comprising an electrolyte sheet; (ii) patterning a surface of said device with glass, glass-ceramic or ceramic based material, thereby producing a patterned device; (iii) sintering said patterned device, thereby producing a frame from said glass, glass-ceramic or ceramic based material.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

BRIEF DESCRIPTION OF THE DRAWINGS

FIG. 1A is a schematic illustration of the (planar) cross-sectional view of an exemplary embodiment of the present invention;

FIG. 1B is a schematic of schematic cross-sectional view of the fuel cell device assembly illustrated in FIG. 1A.

DETAILED DESCRIPTION OF THE PREFERRED EMBODIMENTS

Figure 1C:
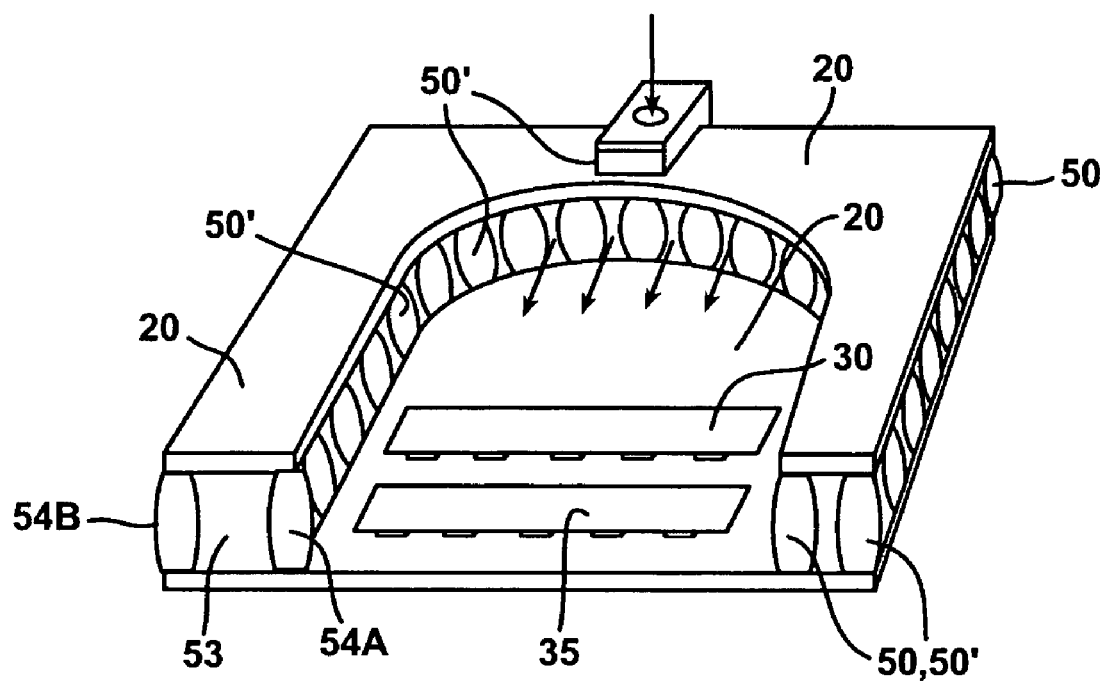
FIG. 1C is a schematic cross-sectional elevational view of the fuel cell device assembly provided of FIGS. 1A and 1B.

Additional features and advantages of the invention will be set forth in the detailed description which follows and will be apparent to those skilled in the art from the description or recognized by practicing the invention as described in the following description together with the claims and appended drawings.

During fuel cell operation, the fuel cell device, seal and frame in a typical solid oxide fuel cell system can be subjected to operating temperatures of from about 600° C. to about 1,000° C. In addition, these components can experience rapid temperature cycling during, for example, startup and shutdown cycles. The thermal mechanical stresses placed on these components can result in deformation, fracture, and/or failure of the components or the entire fuel cell device. The present invention provides several approaches to minimize such deformation, fracture, and/or failure in fuel cell devices and fuel cell device assemblies. The various approaches can be used individually or in combination, as appropriate, and the present invention is not intended to be limited to a single embodiment. All of the embodiments described herein are intended to describe embodiments containing an electrolyte, an electrodes and frame. If an element required for fuel cell operation is not specifically recited, embodiments both including and excluding the element are intended and should be considered part of the invention.

Reference will now be made in detail to the present preferred embodiments of the invention, examples of which are illustrated in the accompanying drawings. Whenever possible, the same reference numerals will be used throughout the drawings to refer to the same or like parts. According to some embodiments of the present invention a solid oxide fuel cell assembly comprise: (i) at least one solid oxide fuel cell (SOFC) device including an electrolyte sandwiched between at least one pair of electrodes; and (ii) a non-steel frame fixedly attached to said at least one fuel cell device without an additional seal located therebetween. Preferably the frame is made of glass, glass ceramic or ceramic material and is bonded directly to the solid oxide fuel cell (SOFC) device. The fuel cell assembly, according to the embodiments of the present invention described herein includes at least two electrolyte sheets, at least one of which corresponds to a fuel cell device.

According to some embodiments of the present invention, glass or glass-ceramic frit is applied in a predetermined pattern on the surface of one or more fuel cell devices to manufacture a SOFC packet. Such frit may be applied by any of the conventional means such as through a molding process or via robotic paste deposition described later in the specification.

One embodiment of the fuel cell device assembly of the present invention is shown in FIGS. 1A-1C, and is designated generally throughout by the reference numeral 10. The fuel cell device assembly 10 shown in FIGS. 1A-1C includes at least one fuel cell device 15 attached to frame 50. The fuel cell device assembly 10 includes at least one reaction chamber 80, formed at least partially by the fuel cell device(s) 15, and the frame 50. Multiple fuel cell devices 15 (e.g., multicell devices), in conjunction with one another and/or frame may also form one or more reactant chambers. For example, two fuel cell devices 15 shown in FIGS. 1A-1C are directly bonded or fused to the frame 50 that is printed on at least one fuel cell device 15, forming a reactant chamber (e.g., anode or fuel chamber 80). The frame 50 also serves as a gas-tight (hermetic) seal and may be made, for example, of conventional heat-sinterable glass-ceramic sealing compositions. The fuel cell device assembly 10 is light weight, for example, weighing lass than 100 gm, and preferably less than 50 gm, with some of the embodiments weighing less than 30 gm. Some of the embodiments of the fuel cell device assembly weigh 20-25 gms.

A fuel cell device 15 (See FIG. 2) includes ceramic electrolyte sheet 20 sandwiched between at least one cathode 30 anode and at least one cathode 40. The anodes and cathodes may be electrically interconnected by conductive via interconnects 35 that extend through via holes in the electrolyte sheets sheet 20. The ceramic electrolyte 20 can comprise any ion-conducting material suitable for use in a solid oxide fuel cell. More specifically, via interconnects 35 traverse the electrolyte sheet 20 from the extending edge of each anode 30 on the interior or fuel side of the electrolyte sheet to the extending edge of the next succeeding cathode in sequence on the air side of the sheet, as best illustrated in FIG. 2.

Figure 2:
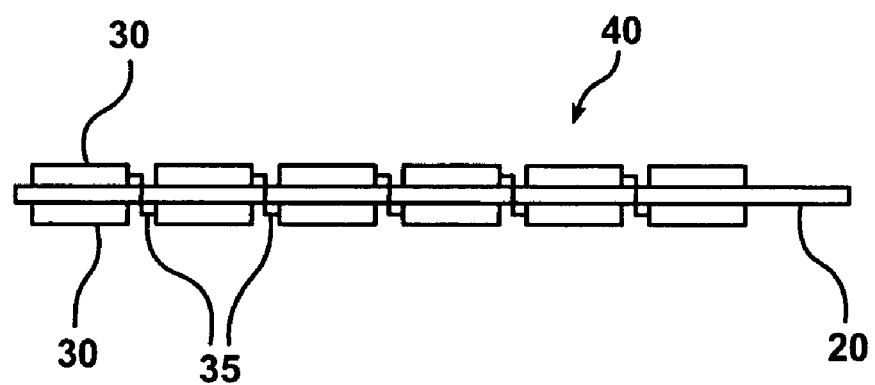
FIG. 2 is a cross-sectional view of a solid oxide fuel cell (SOFC) device utilized in the fuel cell device assembly of FIGS. 1A-1C.

The embodiment of the fuel cell device 15 shown in FIG. 2 includes: (i) at least one electrolyte sheet 20; (ii) a plurality of cathodes 40 disposed on one side of the electrolyte sheet 20; (iii) a plurality of anodes 30 disposed on another side of the electrolyte sheet. For example, the fuel cell device assembly shown in FIG. 1A-1C includes two of fuel cell devices 15 attached to the frame 50, wherein each of these devices includes an electrolyte sheet that supports a plurality of cathodes and anodes. The electrolyte sheets are bonded or fused to the frame 50 and are oriented to enable reactant flow through the frame and between the electrolyte sheets, such that either (i) anodes situated on the first electrolyte sheet face anodes situated on the second electrolyte sheet (forming an anode chamber 80), or (ii) cathodes situated on the first electrolyte sheet face cathodes situated on the second electrolyte sheet (forming a cathode chamber 80'). Preferably the fuel cell devices (i.e., the combined thickness of the electrolyte and electrodes), are less than 150 μm thick and the separation between the two devices (i.e., frame thickness) is less than 3 mm, and preferably between about 1 and 2 mm.

The electrodes 30, 40 can comprise any materials suitable for facilitating the reactions of a solid oxide fuel cell, such as, for example, silver/palladium alloy. The anode and cathode can comprise different or similar materials and no limitation to materials or design is intended. The anode and/or cathode can form any geometric pattern suitable for use in a solid oxide fuel cell. The electrodes can be a coating or planar material positioned parallel to and on the surface of the ceramic electrolyte. The electrodes can also be arranged in a pattern comprising multiple independent electrodes. For example, an anode can be a single, continuous coating on one side of an electrolyte or a plurality of individual elements, such as strips, positioned in a pattern or array.

An anode 30 can comprise, for example, yttria, zirconia, nickel, or a combination thereof. A large variety of other electron and ion conductors as well as mixed electron and ion conductors can also utilized. They are, for example, lanthanum gallates, zirconia doped with ceria or other rare earths, singly or in combination, copper, iron, cobalt and manganese. An exemplary anode can comprise a cermet comprising nickel and the electrolyte material such as, for example, yttria-doped zirconia.

A cathode 40 can comprise, for example, yttria, zirconia, manganate, cobaltate, bismuthate, or a combination thereof.

Exemplary cathode materials can include, yttria stabilized zirconia, lanthanum strontium manganate, and combinations thereof.

The electrolyte 20 can comprise a polycrystalline ceramic such as zirconia, yttria, scandia, ceria, or a combination thereof, and can optionally be doped with at least one dopant selected from the group consisting of the oxides of Y, Hf, Ce, Ca, Mg, Sc, Nd, Sm, Eu, Gd, Tb, Dy, Ho, Er, Tm, Yb, Lu, In, Ti, Sn, Nb, Ta, Mo, W, or a mixture thereof. The electrolyte 20 can also comprise other filler and/or processing materials. An exemplary electrolyte 20 depicted in FIG. 2 is a planar sheet comprised of zirconia doped with yttria, also referred to as yttria stabilized zirconia (YSZ). Solid oxide fuel cell electrolyte materials are commercially available (Ferro Corporation, Penn Yan, N.Y., USA) and one of skill in the art could readily select an appropriate ceramic electrolyte material.

The electrolyte 20 is connected to the frame 50 (See FIGS. 1A-1C), which in this embodiment is formed by a suitable "seal material". Therefore, one of the advantages of the embodiments of the present invention is that no seal is required to attach the fuel cell device to the frame because seal materials are advantageously utilized as frame materials. Another advantage is that the fuel cell device assembly 10 is thin, because no bulky metal frame is required to support fuel cell device(s). Finally, another advantage is that the frame and the electrolyte(s) can now have very similar coefficients of thermal expansion (CTEs), thus providing a very robust thermo-mechanical SOFC assembly that does not delaminate and does not crack during thermal cycling at the seal/device and/or the seal/frame interface due to CTE mismatches of the metal frame and electrolyte.

In these embodiments the frame 50 is bonded directly to the fuel cell device(s) 15. For example, the frame material 50' can be molded, or deposited on, squeezed onto, or "painted" or "printed" on the electrolyte 20 and can comprise a glass ceramic composition, ceramic composition, glass frit composition, or a glass composition. It is preferable that the tube of deposited material 50' be less than 3 mm thick and less than 3 mm wide, preferably less than 2 mm thick and 2 mm wide. The frame material 50' is fused to one or two fuel cell device (s) 15 by fusing the frame material directly to the electrolyte sheets(s) 20. A frame material 50' that includes a glass or glass-ceramic frit can further comprise ceramic materials and/or coefficient of thermal expansion matching fillers. The frame 50 formed of material 50' that comprises a glass frit, or ceramic material, or another suitable "sealing" material does not suffer from formation of chromia scales typically formed by ferritic stainless steel fuel cell components (e.g., stainless steel frames). The frame 50 acts as a seal, and no additional seal between the frame and fuel cell device(s) is thus required by the fuel cell device assembly 10. That is, the seal material 50', upon sintering, forms frame 50.

It is preferable that the frame 50 have CTE close to that of electrolyte sheet 20, in order to provide expansion, comparable to that of the electrolyte sheet 20. If the electrolyte sheet 20 is made of partially stabilized zirconia (e.g., 3YSZ), it is preferable that the frame 50 has CTE (CTE=$\Delta L/L\Delta T$) of about 9 to 13 ppm/° C. and preferably 10 to 12 ppm/° C. Such CTE's may be realized for example, with ceramic compositions within the magnesia (MgO)-spinel ($MgAl_2O_4$) system, or if the frame material is also made of 3YSZ or another partially stabilized zirconia composition.

FIGS. 1A-1C also illustrate that the frame 50 may include multiple chambers, such as one or more "biscuit shaped" gas expansion chambers 52A. These chambers are utilized to provide the required reactant to the anodes and/or cathodes. Distribution chambers (such as gas expansion chambers 52A in this embodiment) help to evenly distribute gas flowing into reactant chamber via inlet orifices), while exit chamber 52B, provide expanded zones for the collection of exhaust fuel into final outlets. The wedged or "biscuit" shape of the gas expansion chambers add sufficient frictional drag to ensure uniform flow.

The frame 50 shown in FIGS. 1a-1C and 3A has a plurality of internal walls 54A and external walls 54B. (Some of these walls are optional, a single external perimeter wall design will also be functional.) These walls are produced, for example, by (i) molding the electrolyte sheet with the frame structure out of the electrolyte sheet material (3YSZ, for example), or (ii) by depositing a layer (e.g., thin tubular layer) of the appropriate "sealant material" on the electrolyte sheet 20 of at least one fuel cell device 15, and placing another electrolyte sheet 20 on top, and then heat treating the resultant fuel cell device assembly to fuse the two electrolyte sheets 20 to the resultant frame/seal structure 50. Some of the internal walls 54A have openings 55 to allow the fuel to flow into reactant chamber and be in contact the anodes. In this embodiment, the fuel passes (see direction of arrows) from the end piece or the incoming fuel inlet tube 70, through the inlet orifice in the device 15, and then through the gas expansion chamber 52A to the anode chamber 80 formed by the two electrolyte sheets. The fuel then flows through the second set of openings 55 into the exhaust flow chamber 52B, and is then exhausted via exhaust apertures 85. In this embodiment the exhaust apertures 85 are located on the section of the frame 50 situated furthest from the end piece 70 (exhaust side).

Figure 3A:
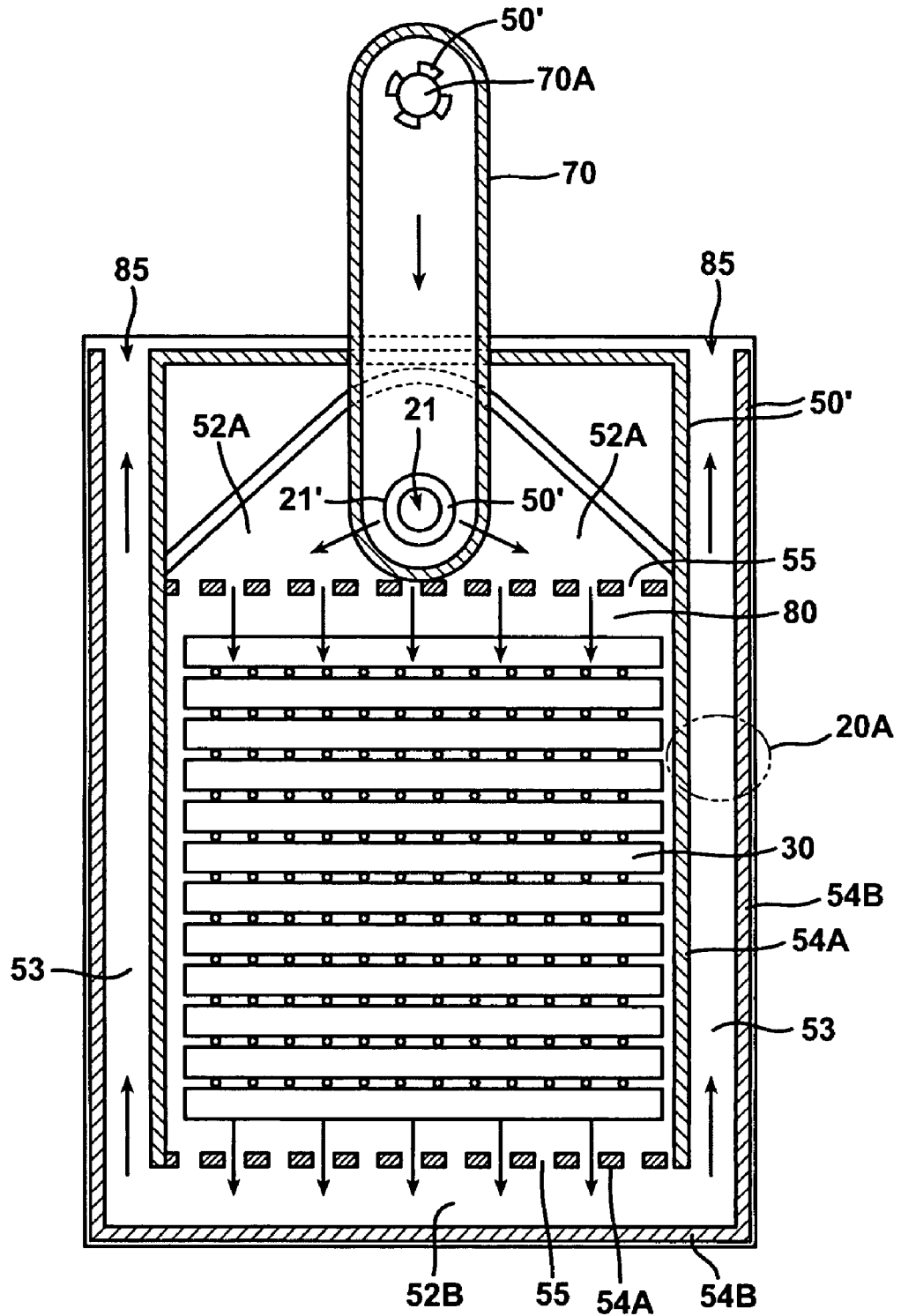
FIG. 3A is a schematic cross-sectional (planar) view of another embodiment of the solid oxide fuel cell device assembly.
Figure 3B:
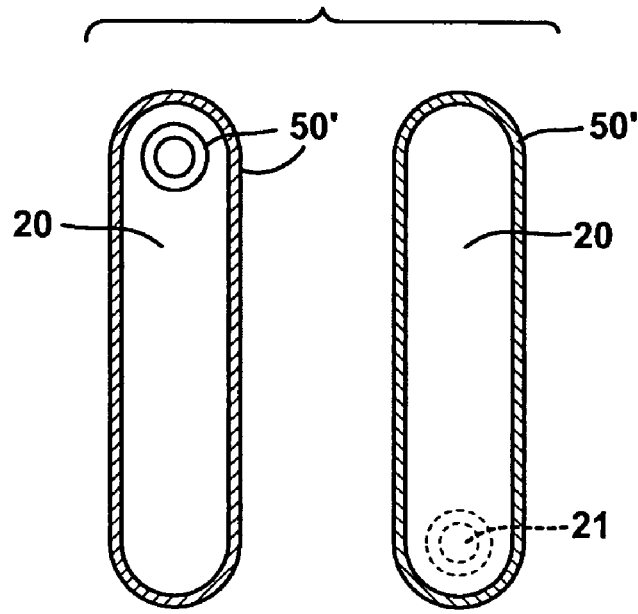
FIG. 3B is a schematic of the two rounded rectangular electrolyte sheets patterned with frit, that will be mated together to form an inlet tube solid oxide fuel cell device assembly of FIG. 3A.
Figure 3C:
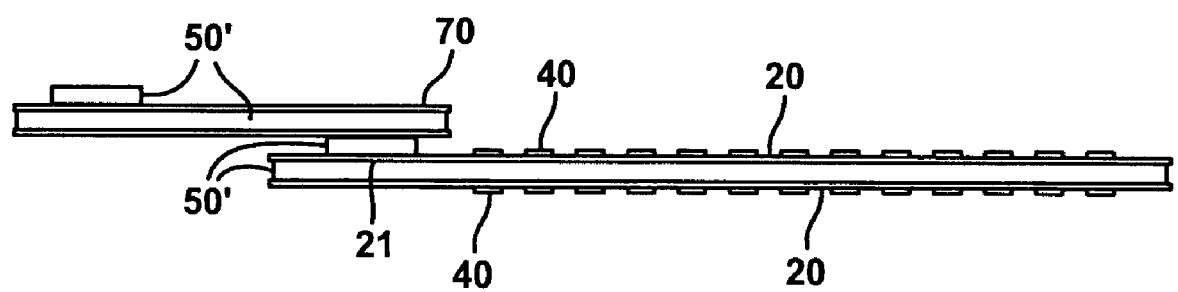
FIG. 3C is a schematic side view of the solid oxide fuel cell device assembly of FIG. 3A.

FIGS. 3A-3C illustrates another embodiment of the present invention. As shown in this figure, frame 50 may also include a plurality of channels 53 formed by the external frame walls 54B and the internal frame walls 54A, which can also be utilized as a heat exchanger, to minimize temperature gradients on the fuel cell device(s) 15. Thus, FIG. 3A illustrates that internal manifolding for the supply of reactant gases (fuel and/or air) for the fuel cell assembly 10 may be provided internal to the frame 50 by providing flow channels 53 between the frame walls 54A and 54b. Channels 53 provide means for partial preheating of the inlet reactant gas(s) entering the reactant chamber 80 and help to ensure uniform heating of the multi-cell-sheet devices. The direction of reactant (e.g., fuel) flow within the fuel cell device assembly is indicated by the arrows. Fuel is fed to the frame 50, for example, through a gas distributing end piece 70 which is sealed to the electrolyte sheet 20 with a framing material 50', forming a seal (sintered frit ring 21') around the inlet orifice 21 of the electrolyte sheet 20. The fuel passes (see direction of arrows) from the end piece 70, the inlet orifice 21, through the flow chamber 52A, to the anode chamber 80 formed by the two electrolyte sheets, into the exhaust flow channels 52B, and is then exhausted via exhaust flow chamber 52B and the exhaust flow channels 53 through exhaust apertures 85.

Making the printed frame 50 with multiple channels 53 or chambers with openings 55 as shown in FIG. 3A, provides the advantage of having a multiple channels for reactant flow, while reducing the frame density and increasing the surface area due to its high OFA (open frontal area). The term "open frontal area" refers to the geometric fraction of the cross-sectional area of the frame 50 that is not filled by the solid materials (walls). It is preferable that OFA be higher than 0.4 and even more preferable that OFA be higher than 0.5. Thus, the apparent density of the frame 50 is low (less than 1, and preferably less than 0.5).

The "apparent" or effective frame density is measured relative to the density of the frame if it was made only from the solid material. Because the printed frame 50 utilizes thin external and internal walls, spaced apart from each other, the frame is relatively light and thermally conductive. Accordingly, this type of frame facilitates good gas flow and heat exchange between incoming fuel and spent fuel.

As stated above, the frame 50 may be made of a glass-ceramic material 50'. Two exemplary compositions of glass-ceramic frit materials 50' are provided in the Table 1 below.

TABLE 1

| Component (wt %) | example 1 | example 2 |
|---|---|---|
| SiO2 | 39.2 | 43.99 |
| CaO | 24.5 | 33.04 |
| Al2O3 | 2.9 | 7.37 |
| BaO | 33.4 | |
| SrO | | 15.60 |

The frame 50 may be made of material(s) 50', such as glass, glass ceramic, or ceramic materials, or combinations thereof, including optional metal or ceramic fillers, wherein the resultant material or composite of materials 50' is sinterable to a hermetic structure below about 1000° C.

According to one aspect of the invention, the present invention for a method of producing a fuel cell device assembly includes the steps of: (i) producing a fuel cell device; (ii) patterning this device with a "sealant material" (for example glass frit, glass-ceramic frit, or a ceramic material); overlaying an electrolyte over the patterned device (iii) sintering the patterned device, thereby forming a fuel cell device assembly such that the fuel cell device and the electrolyte sheet are attached directly to the sintered sealant material without any other component being bonded to the sintered sealant material. Preferably the electrolyte sheet is the electrolyte sheet of another solid oxide fuel cell device, so that at least two fuel cell devices are bonded to one another by the sealant material without having a metal frame situated therebetween. It is noted that the two fuel cell devices may be patterned with the "sealant material" and placed on top of one another so that the sealant material of one device faces the sealant material of another device. The two patterns made of the "sealant material" may be in contact with one another.

EXAMPLE 1

This example illustrates a fuel cell device assembly utilising a ultra-low thermal mass frit-framed devices. The fuel cell device assembly includes a ultra-low thermal mass gas feed tube joined to one of the fuel cell devices.

Frit-Framed Packet.

A 10-cell SOFC device 15 with a printed electrode/busbar area of 9 cm×11 cm is fabricated starting with an "oversized" 14 cm×17 cm electrolyte sheet 20. The sintered starting electrolyte sheet 20 comprises a fully dense 3YSZ ceramic which is about twenty microns thick and is mechanically flexible. The sintered 3YSZ electrolyte sheet 20 supports 10 pairs of anodes and cathodes 30 and 40. Other electrolyte sheet compositions (e.g., 8YSZ) may also be utilised. The oversized electrolyte includes a border area 20A suitable for fit patterning which will provide physical support and manifolding functionality, for example, is at least 1 cm wide. An exemplary boarder thickness is 1 cm to 5 cm, preferably 2 cm to 4 cm. The oversized printed SOFC device 15 is mounted, for example, on a standard robotic paste deposition system and a suitable frit 50' is applied on the anode side of the device 15 and in the pattern illustrated in FIG. 3A. The term, "suitable" frit refers to appropriate thermal expansion coefficient and shrinkage properties which provide a mechanically sound finished fuel cell device assembly. A similar paste pattern (of glass frit) is applied to a second fuel cell device 15 of similar geometry, also on the anode side. Both fuel cell devices 15 are dried to remove solvent contained in the frit material 50', but retain binder such that the green strength of the dried frit paste is sufficient to avoid spalling with handling. A typical retained binder content is 1 to 5 volume percent. After drying, the fuel cell devices 15 are aligned and mated together, such that the two matching frit patterns contact—frit to frit. An optional weight is added on top of the aligned fuel cell devices 15 to ensure uniform contact. The mated fuel devices are fired to sinter the frit material 50' to near full density. After firing, a fuel access port is supplied by laser cutting an opening 21 (inlet orfice) in one side of the fuel cell device assembly 10 as illustrated in FIG. 3A. Note the fuel cell device(s) is patterned with a frit to provide a gas restriction at the inlet and/or exhaust side, for uniform gas distribution. The channels formed between the inner and outer walls 54A and 54B provide for exhaust gas turn-around such that the depleted fuel is exhausted at the "inlet edge" of the fuel cell device assembly 10. The frit material 50' may be deposited in a "funnel shape" pattern about the inlet opening to form curved walls which allow even gas distribution from the gas feed tube 70. In this example, the device inlet seal ring 21' (i.e., deposited material 50') surrounding the inlet opening (inlet orifice 21) is a frit ring of about 1 cm inside diameter and about 1-2 mm wide.

A standard robotic paste deposition system may be, for example, Asymtek Automatic Dispensing System, which includes a computer controlled dispenser with X, Y and Z motion. The dispenser includes of a pressurized barrel for material containment and a customized nozzle/needle for the metered delivery of solids, foams or liquids.

Gas Feed Tube.

To supply gas to the fuel cell device assembly described in the above example, to a gas feed tube 70 is mounted to fuel cell device assembly. In this example, the gas feed tube 70 is constructed of the same twenty micron thick 3YSZ electrolyte material used in device construction above. First, with reference to FIG. 3B, a material 50' (frit) is applied on a rounded sintered rectangle of 3YSZ foil that is 20 cm long by 3 cm wide around its perimeter and also in a circle pattern 21" of the same dimension as the device inlet frit ring (seal ring 21' with the 1 cm inner diameter). The process is repeated on a second identical rectangle. Both are dried to remove solvent but retain binder. The material 50' was made with the glass ceramic frit of Example 1 (Table 1). The two pieces are mated perimeter frit to perimeter frit, and fired under weight to promote good contact during sintering, to make a sealed glass frit sandwich or "tube" 70 (See FIG. 3C). After firing, an opening is laser cut in one side of the tube 70. For example, one opening 70A is cut in the top electrolyte sheet 20 inside the fired frit ring, while the other opening 70B is cut in the second electrolyte sheet 20, inside the frit ring 21" to provide, respectively, for gas inlet (top opening 70A) and supply to the fuel cell assembly 10 (bottom opening, 70B). After fabrication, the feeder tube 70 is joined to the fuel cell device assembly 10 by applying a mating ring of frit around the fuel cell device inlet ring 21', and then drying, weighting and firing the final assembly. The feeder tube top inlet may be joined to conventional piping with conventional materials, such as polymers, if the top region is kept near ambient temperatures during operation.

Optionally, a gas inlet tube may be inserted between the two fuel cell devices 15 then sintering the material 50', thus creating the frame (which also functions as a seal) attached it to the fuel cell device(s) 15 and the gas inlet tube. The gas inlet tube may be, for example pressed into the deposited material 50' of one a first fuel cell device 15, and the second device or electrolyte sheet is then placed (and optionally pressed into) on the one fuel cell device 15, such that the material 50' surrounds the gas inlet tube, and the assembly is then sintered to bond the two fuel devices (or a device and the electrolyte sheet) an the gas inlet tube to one the resulting frame 50 and to one another to create a finished fuel cell device assembly 10.

It is noted that the patterned frit may be applied onto the surface of only one fuel cell device 15, and the second, unpatterned (with material 50') device 15, or just another electrolyte sheet 20 can be placed on top of the first fuel cell device and to be sintered. The sintering process would joint the two devices (or one device and one electrolyte sheet) to one another, with a frame (made from the sealant material 50') being situated therebetween.

EXAMPLE 2

Figure 4:
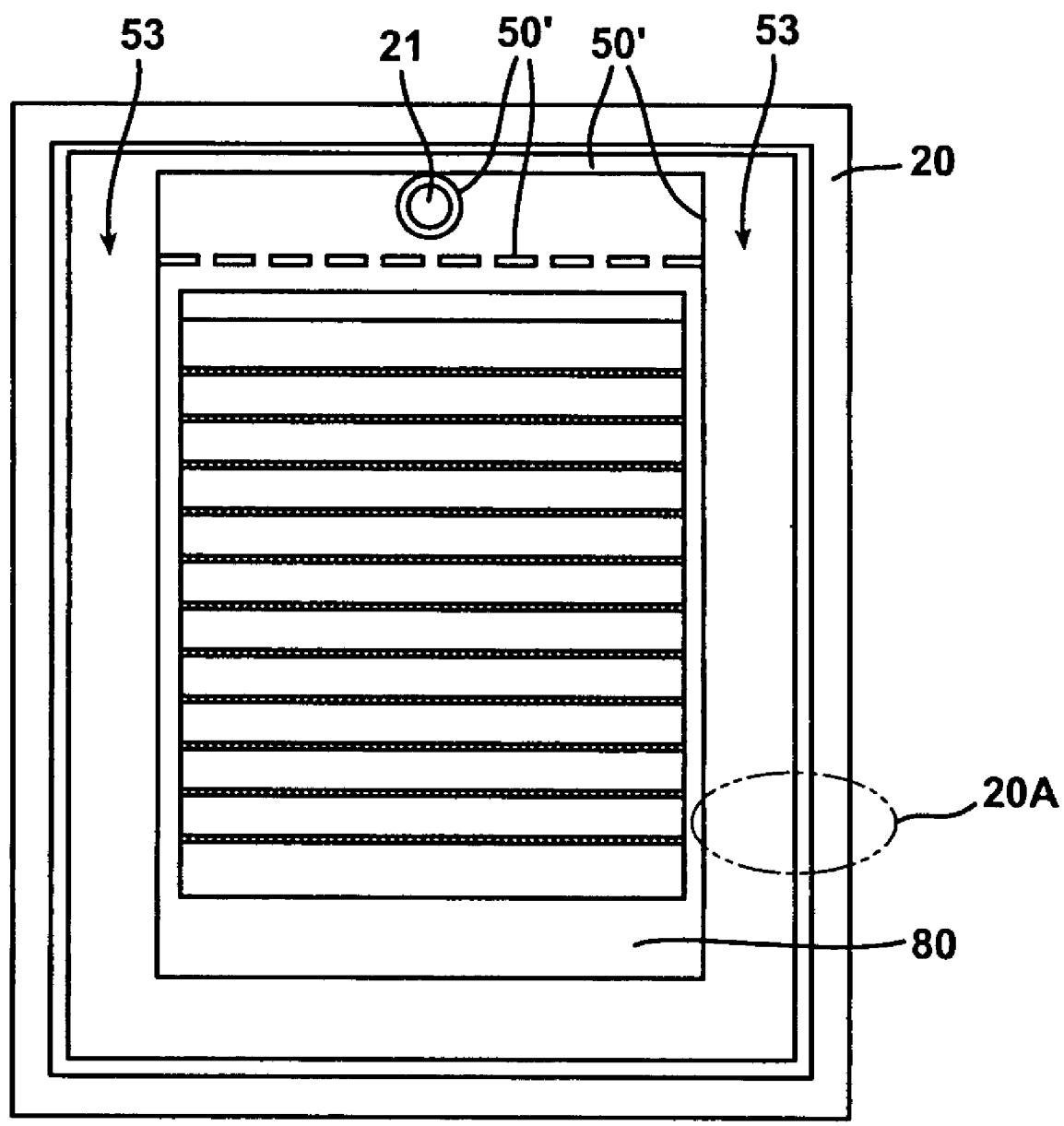
FIG. 4 is a top (planar) view of yet another solid oxide fuel cell device assembly according to an embodiment of the present invention

An example of an actual packet fabricated according to this example is shown in FIG. 4. The fuel cell device assembly of FIG. 4 is similar to that of FIG. 3, but utilizes one (not two) fuel cell device 15 and one electrolyte sheet 20. The fuel cell device 15 and one electrolyte sheet 20 are attached to one another with the sintered material 50'. The frit material 50' utilised in this embodiment of the present invention is an expansion matched (to the electrolyte) frit mixture of 80% glass-ceramic of Example 1 (Table 1) with 20% Magnesia, added to inhibit sintering shrinkage and raise CTE.

As illustrated in the above example, this embodiment offers several important advantages:

1) In the embodiments of the present invention a low thermal mass fuel cell device assembly is fabricated with a frit frame and internal manifolding functionality provided by patterned frit gas channels. In the embodiments of the present invention the thermal mass and conductivity of the seal/frame 50 are similar to that of the electrolyte 20, thereby reducing transient stress during heating or cooling.
2) Exemplary frit compositions have appropriate thermal expansion matchto the fuel cell devices and provide controlled sintering shrinkage. An example of a suitable frit is a modified cyclosilicate frit—a mixture of 80% by volume of Example 1 glass ceramic (see above Table 1) with 20% magnesia to increase CTE and reduce sintering shrinkage. Other suitable cyclosilicate compositions that can be used as a frame material 50' are described in U.S. patent application Ser. No. 11/402,761, filed on Apr. 11, 2006, which is incorporated by reference herein.
3) A gas feed tube according to the disclosed embodiments is mated/attached to the frit-framed fuel cell device assembly 10. However, different gas feed design approaches and materials may be utilised.
4) The resultant frame 50 does not form chromia scale, such as that typically formed by the ferric steel frames of solid oxide fuel cell assemblies.
5) The fuel cell device assembly is low weight, preferably weighing less than 100 gm, more preferably weighing less than 50 gm, and even more preferably weighing less than 30 gm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A solid oxide fuel cell device assembly comprising:
   (i) at least one solid oxide fuel cell device including one electrolyte sheet sandwiched between at least one pair of electrodes, including at least one cathode and at least one anode; and
   (ii) a non-steel frame, said frame supporting said at least one solid oxide fuel cell device and being fixedly attached to said at least one fuel cell device without a seal located therebetween, and is situated in physical separation from at least non-edge portions of said at least one cathode and at least one anode wherein said frame is not an electrical interconnect.

2. The solid oxide fuel cell device assembly according to claim 1 wherein said frame is made of glass, ceramic, or glass-ceramic material and is sintered or cemented to said fuel cell device.

3. The solid oxide fuel cell device assembly according to claim 2 wherein said frame is a hermetic seal.

4. The solid oxide fuel cell device assembly according to claim 2 wherein said assembly includes two fuel cell devices separated by said frame.

5. The solid oxide fuel cell according to claim 4 wherein said electrolyte sheet is less than 40 µm thick.

6. The solid oxide fuel cell according to claim 5 wherein said electrolyte sheet is less than 40 µm thick, the thickness of the electrolyte and said at least one pair of electrodes is less than 150 µm and the separation between the two devices is less than 3 mm.

7. The solid oxide fuel cell device assembly according to claim 2 wherein said electrolyte sheet is less than 40 µm thick and said frame has wall thicknesses of less than about 2 mm.

8. The solid oxide fuel cell device assembly according to claim 1, further including a gas feeder tube providing reactant gas to said fuel cell device.

9. The solid oxide fuel cell device assembly according to claim 2, further including manifolding made of glass or glass-ceramic material, wherein said frame fixedly joins said at least one solid oxide fuel cell device to another solid oxide fuel cell device.

10. The solid oxide fuel cell device assembly according to claim 9, wherein said frame includes a heat exchanger.

11. The solid oxide fuel cell device assembly according to claim 10, wherein said frame is a hermetic seal.

12. A method for producing the fuel cell device assembly of claim 1 comprising the steps of:
   (i) producing a fuel cell device comprising an electrolyte sheet;
   (ii) patterning a surface of said device with glass, glass-ceramic or ceramic based material, producing a patterned device;
   (iii) sintering said patterned device, thereby producing a frame from said glass, glass-ceramic or ceramic based material.

13. The method for producing a fuel cell device assembly according to claim 12 comprising the steps of: (i) producing another fuel cell device comprising an electrolyte sheet; (ii) placing one of said fuel cell device on top another one of said fuel cell devices, such that the patterned areas face one another; (iii) sintering said fuel cell devices to fuse the patterns to said fuel cell devices, thereby forming a frame between said fuel cell devices.

14. A method for producing a fuel cell device assembly according to claim 13 further comprising the steps of:

(i) producing two fuel cell devices, each comprising an electrolyte sheet;
(ii) patterning said devices with glass, glass-ceramic or ceramic based material;
(iii) placing one of said fuel said devices on top of another of said fuel cell devices, such that their patterned surface are aligned with respect to one another;
(iv) sintering said patterned devices, thereby producing a frame from said glass, glass-ceramic or ceramic based material and forming a fuel cell device assembly.

15. The method for producing a fuel cell device assembly according to claim 12 comprising the steps of: (i) producing another fuel cell electrolyte sheet; (ii) placing said fuel cell device and said electrolyte sheer in close proximity to one another, with patterned surface therebetween, such that the pattern is in contact with said another fuel cell sheet; (iii) sintering said fuel cell devices to fuse the pattern to both said fuel cell device and said another fuel cell electrolyte sheet, forming a frame therebetween.

16. The method of claim 12 wherein a feeder tube is joined to said fuel cell device assembly.

17. The method of claim 12 wherein said pattern forms at least one chamber or a channel within said frame.

18. The solid oxide fuel cell device assembly according to claim 1 wherein said frame is less than 3 mm thick.

19. The solid oxide fuel cell device assembly according to claim 18 wherein said frame is no more than 2 mm thick.

20. The solid oxide fuel cell device assembly according to claim 1 wherein said frame includes gas distribution structure made of glass or glass ceramic frit, and fixedly joints least one solid oxide fuel cell device to another fuel cell component.

21. A solid oxide fuel cell device assembly comprising:
(i) at least one solid oxide fuel cell device including one electrolyte sheet sandwiched between at least one pair of electrodes, including at least one cathode and at least one anode; and
(ii) a non-steel frame from glass, or glass-ceramic based material, said frame being fixedly attached to said at least one fuel cell device without a seal located therebetween and is situated in physical separation from at least non-edge portion of said at least one cathode and one anode wherein said frame is not an electrical interconnect.

22. The solid oxide fuel cell according to claim 21 comprising at least two solid oxide fuel cell devices, wherein said electrolyte sheets are less than 40pm thick, the thickness of the electrolyte and said at least one pair of electrodes is less than 150 μm and the separation between the two solid oxide fuel cell devices is less than 3 mm.

23. The solid oxide fuel cell according to claim 22 wherein each of said at least two solid oxide fuel cell devices include a plurality of fuel cells located on a common electrolyte sheet, each of said fuel cells comprising of one cathode and one anode.

24. The solid oxide fuel cell according to claim 21 wherein said frame is made from glass or glass-ceramic frit and said frame includes gas distribution structure made of glass or glass ceramic frit and fixedly joints least one solid oxide fuel cell device to another fuel cell component.

* * * * *